(12) United States Patent
Liang et al.

(10) Patent No.: US 9,414,400 B2
(45) Date of Patent: Aug. 9, 2016

(54) METHOD OF SCHEDULING RADIO RESOURCE IN WIRELESS LOCAL AREA NETWORK

(71) Applicant: Alcatel Lucent, Boulogne-Billancourt (FR)

(72) Inventors: Zheng Liang, Shanghai (CN); Fanxiang Bin, Shanghai (CN); Haibo Wen, Shanghai (CN); Chunyan Yao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 47 days.

(21) Appl. No.: 14/376,792

(22) PCT Filed: Mar. 4, 2013

(86) PCT No.: PCT/IB2013/000538
§ 371 (c)(1),
(2) Date: Aug. 5, 2014

(87) PCT Pub. No.: WO2013/132328
PCT Pub. Date: Sep. 12, 2013

(65) Prior Publication Data
US 2015/0049686 A1 Feb. 19, 2015

(30) Foreign Application Priority Data

Mar. 9, 2012 (CN) .......................... 2012 1 0062329

(51) Int. Cl.
*H04L 1/00* (2006.01)
*H04W 72/12* (2009.01)
*H04W 74/00* (2009.01)
*H04W 72/04* (2009.01)
(Continued)

(52) U.S. Cl.
CPC .......... *H04W 72/1205* (2013.01); *H04W 72/04* (2013.01); *H04W 74/006* (2013.01); *H04W 72/121* (2013.01); *H04W 74/08* (2013.01); *H04W 84/12* (2013.01)

(58) Field of Classification Search
CPC ..... H04W 72/04; H04W 72/05; H04W 72/06; H04W 84/08; H04W 84/09; H04W 84/10; H04W 84/12; H04W 84/13; H04W 84/14; H04W 84/15

USPC .......................... 370/329, 328, 341, 348, 431
See application file for complete search history.

(56) References Cited

U.S. PATENT DOCUMENTS 5,365,523 A * 11/1994 Derby ..................... H04L 12/66
370/402
2007/0258473 A1 11/2007 Ruffino et al.
(Continued)

FOREIGN PATENT DOCUMENTS

CN 101772032 A 7/2010
EP 1566922 A1 8/2005
(Continued)

OTHER PUBLICATIONS

International Search Report PCT/ISA/210 for International Application No. PCT/IB2013/000538 Dated Aug. 27, 2013.

*Primary Examiner* — Dady Chery
(74) *Attorney, Agent, or Firm* — Harness, Dickey & Pierce, P.L.C.

(57) ABSTRACT

The invention relates to a method, in an access point of a wireless local area network, of scheduling a radio resource, wherein at least one categorization rule is set in the wireless local area network, and at least one access group is set for a plurality of non-access-point stations served by the access point according to each of the at least one categorization rule, the method comprising the steps of: sending at least one categorization message to at least one of the plurality of stations, each categorization message comprising information about one of all the access groups which are set in the wireless local area network according to the at least one categorization rule; and sending a clear-to-send frame to the plurality of stations to indicate a radio resource allocated to an access group to be protected among all the access groups. The invention can distinctly resolve the contention for radio resource between the stations, effectively limit the number of concurrently contending stations and provide flexibility in access control of an access group.

13 Claims, 7 Drawing Sheets

(51) Int. Cl.
*H04W 74/08* (2009.01)
*H04W 84/12* (2009.01)

(56) References Cited

U.S. PATENT DOCUMENTS

2010/0150116 A1  6/2010  Ji et al.
2011/0194644 A1  8/2011  Liu et al.
2011/0261708 A1* 10/2011  Grandhi ................ H04W 24/10
                                                370/252

FOREIGN PATENT DOCUMENTS

| JP | 2004535695 A | 11/2004 |
| JP | 2008187520 A | 8/2008 |
| KR | 20080095718 A | 10/2008 |
| WO | WO-2010134768 A2 | 11/2010 |
| WO | WO-2011142839 A2 | 11/2011 |
| WO | WO-2011158407 A1 | 12/2011 |
| WO | WO-2012012229 A2 | 1/2012 |

* cited by examiner

METHOD OF SCHEDULING RADIO RESOURCE IN WIRELESS LOCAL AREA NETWORK

FIELD OF THE INVENTION

The present disclosure relates to a wireless local area network and particularly to a method of scheduling a radio resource in a wireless communication network.

BACKGROUND OF THE INVENTION

Applications of an IEEE 802.11 wireless local area network (especially inside homes) have been increasing and become more and more complicated. Various applications, e.g., smart home automation, entertainment products, etc., have considerably changed the amount of traffic over the home wireless network. The traffic in home is no longer caused by PCs or laptops only, but also by a number of sensors, e.g., temperature sensors, energy meters, multimedia sensors, etc. Such varieties result in a wide range of data rates from several kbps to Mbps in the home traffic, which greatly challenges the IEEE 802.11 wireless local area network.

As well known, the IEEE 802.11 wireless local area network was originally designed for best-effort services. A contention based access is the basis of IEEE 802.11's various traffic control schemes. However this simple access scheme usually causes a high error rate, contention and retransmission frequency as well as unpredictable delays and jitters, all of which greatly lower the quality of a (real-time) voice/video service in the IEEE 802.11 based wireless local area network.

Technical problems with traffic control for the IEEE 802.11 contention based access are listed as follows:

Problem 1: Access Category Limitation of IEEE 802.11.

IEEE 802.11e defines only 4 Access Categories (ACs), that is, AC_BK (Background), AC_BE (Best-Effort), AC_VI (Video) and AC_VO (Voice). For achieving preferential treatment, the existing IEEE 802.11 requires the traffic of a station to be categorized as either AC_VI or AC_VO even if the traffic is quite different from video or voice. Such an approach may cause a higher probability of contention and retransmission in the AC_VI and AC_VO categories. For example, heavy interference may be observed among multiple stations of real-time home automation and security services as well as WiFi-enabled TV, because they all belong to the same access category of AC_VI and all compete for a radio resource at the same priority.

Problem 2: Heavy Signaling Overhead for Traffic Control.

During IEEE 802.11 contention, a contention-free interval may be allocated to a protected traffic source by means of a Clear to Send (CTS) frame. In addition, the unprotected traffic sources may sleep for a period of time in accordance with piggyback information in their acknowledgement (ACK) frames so as to clear the access channel for providing contention-free intervals for the protected traffic source. These existing approaches are not scalable and may lead to a considerable signaling overhead when considering the increasing numbers of traffic sources at home.

Since the contention based access is the basis of IEEE 802.11, the aforementioned problems exist not only in a Distributed Coordination Function (DCF) but also in a Point Coordination Function (PCF) and a Hybrid Coordination Function (HCF).

SUMMARY OF THE INVENTION

In view of the foregoing understanding of the prior art and the existing technical problems, it will be rather beneficial if a method of scheduling a radio resource can be provided to lower the probability of contention and retransmission in a wireless local area network without a significantly increased signaling overhead.

According to a first aspect of the invention, there is provided a method, in an access point of a wireless local area network, of scheduling a radio resource, wherein at least one categorization rule is set in the wireless local area network, and at least one access group is set for a plurality of non-access-point stations served by the access point according to each of the at least one categorization rule, the method comprising the steps of: sending at least one categorization message to at least one of the plurality of stations, each categorization message including information about one of all the access groups which are set in the wireless local area network according to the at least one categorization rule, and the information about the access group including first information, second information and third information, wherein the first information indicates the categorization rule of the access group, the second information indicates an access group label of the access group, and the third information indicates a status code of the access group; and sending a clear-to-send frame to the plurality of stations to indicate a radio resource allocated to an access group to be protected among all the access groups.

According to a second aspect of the invention, there is provided a method, in a non-access-point station of a wireless local area network, of assisting in scheduling a radio resource, wherein the wireless local area network comprises a plurality of non-access-point stations and an access point serving the plurality of non-access-point stations, at least one categorization rule is set in the wireless local area network, and at least one access group is set for the plurality of non-access-point stations according to each of the at least one categorization rule, the method comprising the steps of: receiving at least one categorization message from the access point, each categorization message comprising information about one of all the access groups which are set in the wireless local area network according to the at least one categorization rule, and the information about the access group comprising first information, second information and third information, wherein the first information indicates the categorization rule of the access group, the second information indicates an access group label of the access group, and the third information indicates a status code of the access group; joining/not joining/staying in/leaving the access group according to the third information of the access group; receiving a clear-to-send frame from the access point; and if an access group, to be protected, indicated in the clear-to-send frame is the access group which the station currently has joined, then contending for a radio resource in a period indicated in the clear-to-send frame.

According to the solutions of the invention, non-access-point stations are divided into access groups, and a non-access-point station may concurrently belong to a plurality of access groups. A non-access-point station can Join/Not Join/Stay in/Leave an access group dynamically. Each group can be equivalently regarded as an access category, so more access categories can be provided for refined traffic control. Moreover the invention can distinctly resolve the contention for radio resource between the stations and effectively limit the number of concurrently contending stations.

The invention can further provide flexibility in access control of an access group. An access point may schedule the access groups not only in a fixed order but also by sending a CTS frame in an unsolicited manner to prioritize the access groups as needed in practice. Advantageously a period reserved for an access group can also be varied flexibly.

BRIEF DESCRIPTION OF DRAWINGS

Other features, objects and advantages of the invention will become more apparent upon reviewing the following detailed description of non-limiting embodiments taken with reference to the drawings in which.

Identical or like reference numerals denote identical or like devices (modules) or steps throughout the drawings.

DETAILED DESCRIPTION OF EMBODIMENTS

Figure 1:
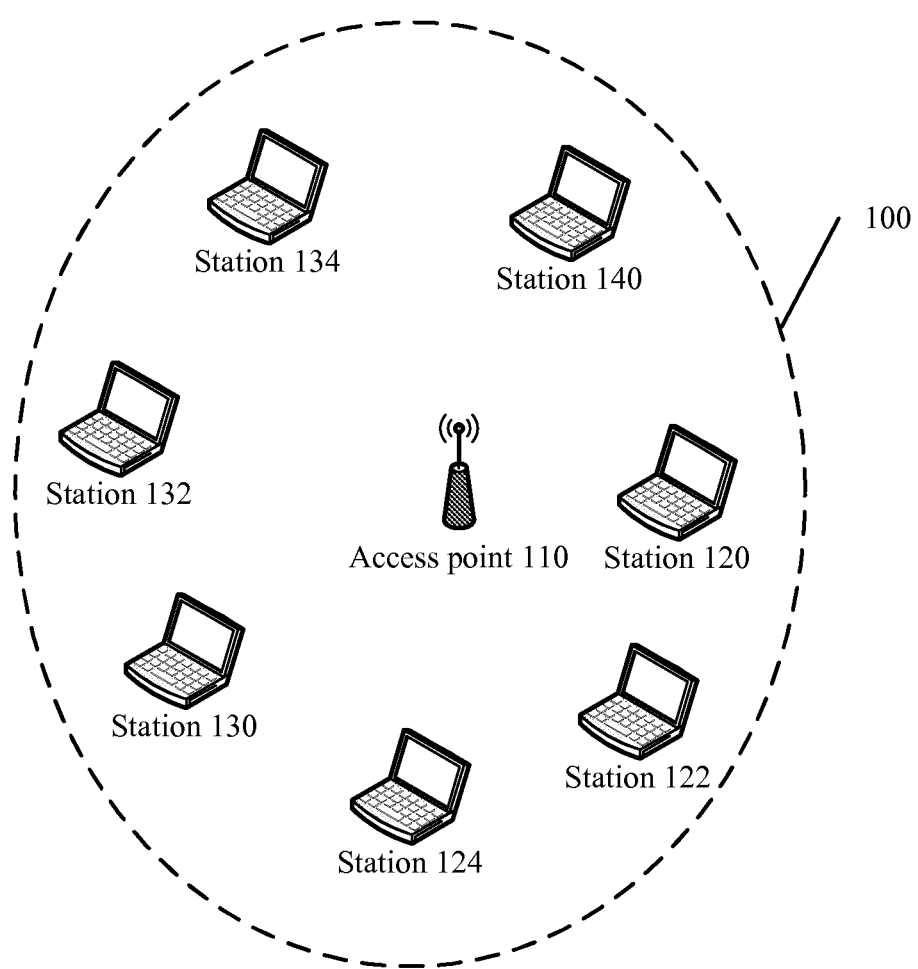
FIG. 1 illustrates a schematic diagram of a network topology of a wireless local area network according to an embodiment of the invention.

FIG. 1 illustrates a schematic diagram of a network topology of a wireless local area network according to an embodiment of the invention. The wireless local area network includes an access point 110 and stations 120, 122, 124, 130, 132, 134 and 140. The stations 120, 122, 124, 130, 132, 134 and 140 are located within the coverage area of the access point 110, and are non-access-point stations served by the access point 110. The access point 110 and all the aforementioned stations jointly form a Basic Service Set (BSS). Typically the identifier (ID) of the basic service set 100 is same as the MAC address of the access point 110. The wireless local area network to which the basic service set 100 belongs may be named and identified by the Service Set Identifier (SSID). Although all the non-access-point stations illustrated here are notebook computers, those skilled in the art can appreciate that the non-access-point station may also include handsets, sensors and other devices. In this embodiment, the access point operates in a DCF mode, but those skilled in the art can appreciate that an implementation of the invention will not be limited to any operating mode of the access point but also can be applicable any other coordination function mode involving contention.

An embodiment of the invention relates to a method, in an access point of a wireless local area network, of scheduling a radio resource, wherein at least one categorization rule is set in the wireless local area network, and at least one access group is set for a plurality of non-access-point stations served by the access point according to each of the at least one categorization rule.

In an embodiment of the invention, the categorization rule may include but will not be limited to, for example, the 4 access categories defined in IEEE 802.11e. For example, the stations can be categorized according to N (N represents a positive integer below 48) least significant bits of their MAC addresses, that is, the stations with the same N least significant bits in their MAC addresses belong to the same access group.

Since many other categorization rules may be designed and adopted, a Categorization Rule Index (CRI) is adopted to distinguish different categorization rules for the sake of clarity in the description of the invention.

The respective stations served by the access point 110 can be divided into several Access Groups (AGs) according to any categorization rule. Each access group is associated with a newly defined Access Group Label (AGL). Thus one access group can be uniquely identified by a 2-tuple <CRI, AGL>, i.e., an access group ID. In an embodiment of the invention, the CRI is encoded into an octet and thus takes a value ranging from 0×00 to 0×FF. That means up to 256 categorization rules are supported. The AGL is also encoded into an octet and thus also takes a value ranging from 0×00 to 0×FF, which means that up to 256 groups can be supported by each categorization rule. Thus the number of all the access groups which are set according to the respective categorization rules is up to 256*256=65536. Accordingly the invention has good extensibility and can accommodate the complexity of hybrid home applications.

One station is typically associated with only one AG, but those skilled in the art can appreciate that a station may be associated with more than one AG. In the embodiment illustrated in FIG. 1, for example, with a first categorization rule CRI 1, the stations 120, 122 and 124 are categorized into a group identified by <CRI 1, AGL 1>, and the stations 130, 132 and 134 are categorized into a group identified by <CRI 1, AGL 2>; and with a second categorization rule CRI 2, the stations 121 and 131 are categorized into a group identified by <CRI 2, AGL 1>, and the stations 120, 130 and 140 are categorized into a group identified by <CRI 2, AGL 2>. That is, with the first categorization rule CRI 1, the station 120 belongs to AGL 1, and with the first categorization rule CRI 2, for example, the station 120 belongs to AGL 2. The station 120 can be associated with multiple access group IDs in the form of 2-tuple, i.e., <CRI 1, AGL 1> and <CRI 2, AGL 2>. For the sake of a convenient description of the invention, each station is associated with only one AG at a time.

The method in an embodiment of the invention comprises the step of: a. sending at least one categorization message to at least one of the plurality of stations, each categorization message comprising information about one of all the access groups which are set in the wireless local area network according to the at least one categorization rule, and the information about the access group comprising first information, second information and third information, wherein the first information indicates the categorization rule of the access group, the second information indicates an access group label of the access group, and the third information indicates a status code of the access group.

Specifically, the access point 110 can send the access group information in a broadcast or uni-cast form to at least one non-access-point station in a downlink frame, or send the access group information in a uni-cast manner to the non-access-point station that sends the request in response to the request of the non-access-point station. The downlink frame includes a Beacon frame, an Association Response frame, a Probe Response frame, an action frame to be detailed below, etc. The access group information sent from the access point 110 includes information about a categorization rule and information about at least one AGL corresponding to the categorization rule. Optionally, all the AGLs corresponding to a categorization rule can be included in the broadcast access group information.

In an embodiment of the invention, the access group information is encoded into a newly defined information element. FIG. 2(a) illustrates an encoding format of an access group information element according to an embodiment of the invention. In order to achieve good compatibility, the size of the access group information complies with the minimum upper limit of the sizes that can be received by all the stations. In the embodiment illustrated in FIG. 2(a), the access group information element includes:

(1) Element ID information, 1-octet field indicating and identifying this element as an access group information element.

(2) Length information, 1-octet field indicating the number of octets in the access group Information field.

(3) Access Group Information, variable length field containing a variable number of Sub-Access Group (SubAG) subfields. In the illustrated embodiment, the access group information includes n SubAGs, wherein the length of each SubAG is variable.

FIG. 2(b) illustrates an encoding format of a SubAG field according to an embodiment of the invention. The SubAG field includes:

(1) CRI, 1-octet field indicating and identifying which categorization rule has been utilized.

(2) Number of AGLs, 1-octet field indicating the number of AGLs under this categorization rule.

(3) AGL n, 1-octet field indicating and identifying one of the access groups corresponding to the categorization rule indicated in the CRI field.

(4) Access Group Status Code, 1-octet field indicating the status of the access group related to the AGL n. The value of this field provides guides for stations to join, stay in or leave the access group. The value and meaning for the Access Group Status Code are depicted in Table 1.

TABLE 1

Access Group Status Code

| Name | Value | Meaning |
| --- | --- | --- |
| Join | 0x00 | The station should join in the access group |
| Conditional Join (low) | 0x01 | The station joins in the access group in accordance with a low probability |
| Conditional Join (high) | 0x02 | The station joins in the access group in accordance with a high probability |
| ... | ... | ... |
| Stay | 0x10 | The station should stay in the access group |
| ... | ... | ... |
| Conditional Leave (low) | 0xFD | The station leaves the access group in accordance with a low probability |
| Conditional Leave (high) | 0xFE | The station leaves the access group in accordance with a high probability |
| Leave | 0xFF | The station should leave the access group |

For the sake of simplicity here the capabilities of categorizing and protecting stations in terms of access group are simply referred to as AG capabilities. The access point 100 can indicate its AG capability by using the extended capability information element. For example, one reserved bit in the capability field of the extended capability information element can be utilized for this purpose. Setting the bit to 1 (0) indicates the availability (unavailability) of the AG capability. Alternatively, presence of an AG information element in a downlink frame (e.g., Beacon, Association Response, Probe Response frames, etc.) can also be regarded as an indication of availability of the AG capability.

Upon reception of the indication of the AG capability, the associated stations will be aware that the IEEE 802.11 wireless local area network will perform the DCF mode in terms of access group. More particularly, the associated stations will be aware that information indicating the protected AG can be found in the CTS frame.

Figure 3:
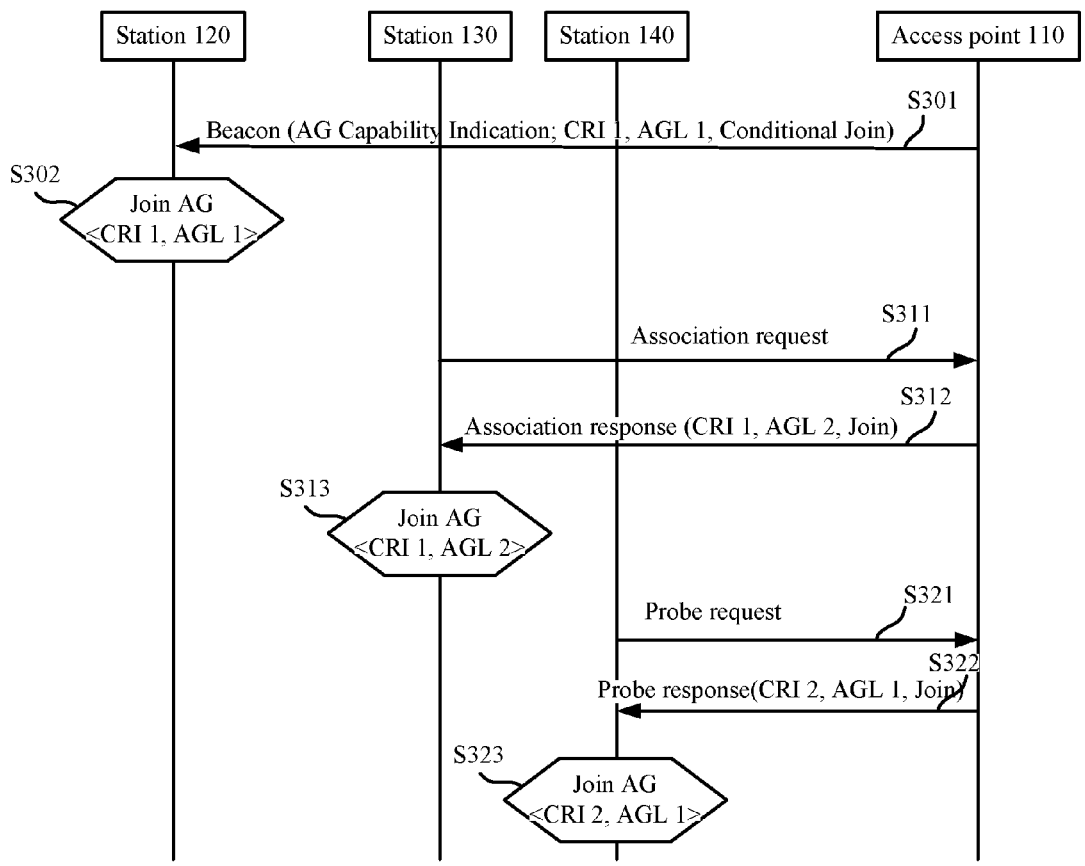
FIG. 3 illustrates a flow chart of a startup process for allocating stations to different access groups according to an embodiment of the invention.

FIG. 3 illustrates a flow chart of a startup process for allocating stations to different access groups according to an embodiment of the invention.

In the step S301: the access point 110 sends a Beacon frame to the station 120. Although not illustrated in FIG. 3, those skilled in the art can appreciate that alternatively the Beacon frame can be sent in a broadcast form to all the stations served by the access point 110. In the Beacon frame, the bit identifying the AG capability is set to 1 to explicitly indicate that the access point 110 has the AG capability. Furthermore the Beacon frame also carries an AG information element indicating that the access group identified by <CRI 1, AGL 1> is conditionally opened for accepting stations, because the Access Group Status Code thereof is "Conditional Join". In accordance with such information, the station 120 joins the access group identified by <CRI 1, AGL 1>. Those skilled in the art can appreciate that the station 120 may not join the access group.

Those skilled in the art can appreciate that the Beacon frame may not to include any AG information element. Upon recognizing that the bit identifying the AG capability is set to 1, the station will be aware that the access point has the capability of protecting stations in terms of access group and thus the station can request the access group information from the access point 110 by sending a second request message, e.g., an Association Request or Probe Request frame.

For example, in the step S311, the station 130 sends an Association Request frame to the access point 110. Upon reception of the Association Request, the access point 110 sends an Association Response frame carrying an AG information element to the station 130 in the step S312, and in this embodiment, the AG information element indicates that the access group identified by <CRI 1, AGL 2> is opened for accepting any stations. In the step S313, the station 130 joins the access group identified by <CRI 1, AGL 2> as required by the access point 110. Those skilled in the art can appreciate that the Association Response frame is sent in response to the Association Request frame and thus is sent in a uni-cast manner.

In another example, in the step S321, the station 140 sends a Probe Request frame to the access point 110. Upon reception of the Probe Request, the access point 110 sends a Probe Response frame carrying an AG information element to the station 130 in the step S322, and in this embodiment, the AG information element indicates that the access group identified by <CRI 2, AGL 1> is opened for accepting any stations. In the step S323, the station 140 joins the access group identified by <CRI 2, AGL 1> as required by the access point 110. Those skilled in the art can appreciate that the Probe Response frame is sent in response to the Probe Request frame and thus is sent in a uni-cast manner.

The method according to the invention further includes the step of: b. sending a clear-to-send frame to the plurality of stations to indicate a radio resource allocated to an access group to be protected among all the access groups.

In an embodiment of the invention, a receiver address indicated in the clear-to-send frame indicates the group address of the access group to be protected.

Figure 4:
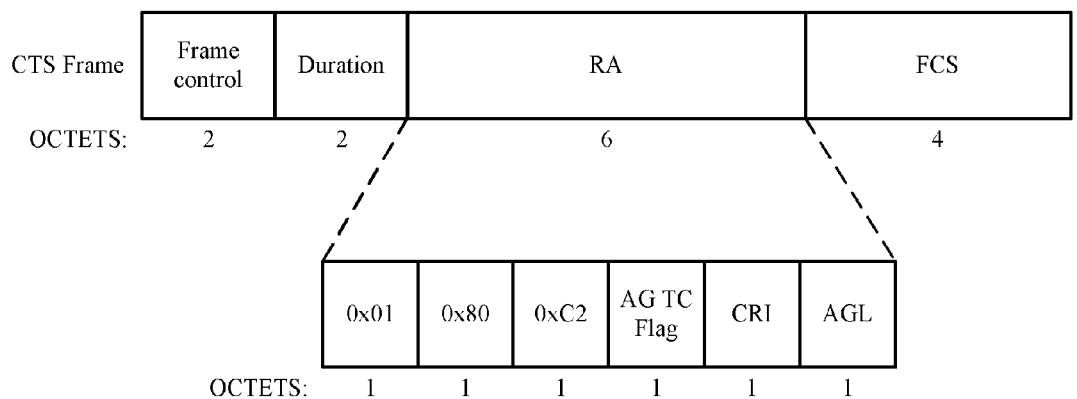
FIG. 4 illustrates an encoding format of a CTS frame according to an embodiment of the invention.

FIG. 4 illustrates an encoding format of a CTS frame according to an embodiment of the invention. In this embodiment, the CTS frame is not changed in format, but simply a Receiver Address (RA) field in the frame is utilized to carry the identification of an access group, i.e., the 2-tuple <CRI, AGL>. It is known in prior art that the RA is typically the same as the uni-cast MAC address of the protected station. However in the invention RA is changed to a group MAC address indicating the access group being protected. In an embodiment of the invention, the MAC address of the access group can be in the IEEE reserved MAC address range of 80-C2-00-03-00 to 01-80-C2-FF-FF-FF. For example, the first 3 octets of the RA field are 80-C2-00 as illustrated in FIG. 4, and the other octets in the RA field are defined as:

(1) Access Group Traffic Control (TC) Flag, 1-octet field indicating that this group MAC address is used for protecting stations in terms of access group. For example, it can be (but not limited to) defined as 0×01.

(2) CRI, 1-octet field indicating and identifying which categorization rule has been utilized.

(3) AGL, 1-octet field indicating and identifying one of the access groups corresponding to the categorization rule indicated in the CRI field.

Moreover, the Duration field in the CTS frames indicates a network allocation vector time reserved for the stations in the protected access group identified by <CRI, AGL>. During the network allocation vector time, a protected station can send a data frame to the access point if it succeed in contending for a radio resource, whereas all the other stations of a different access group fall into sleep.

According to an embodiment of the invention, after the non-access-point station receives the clear-to-send frame from the access point, if the access group, to be protected, indicated in the clear-to-send frame is the access group in which the station currently has joined, then the station contends for a radio resource in the period indicated in the clear-to-send frame.

Furthermore, if the access group, to be protected, indicated in the clear-to-send frame is different from the access group in which the station currently has joined, then the station keeps sleeping in the period indicated in the clear-to-send frame.

Figure 5:
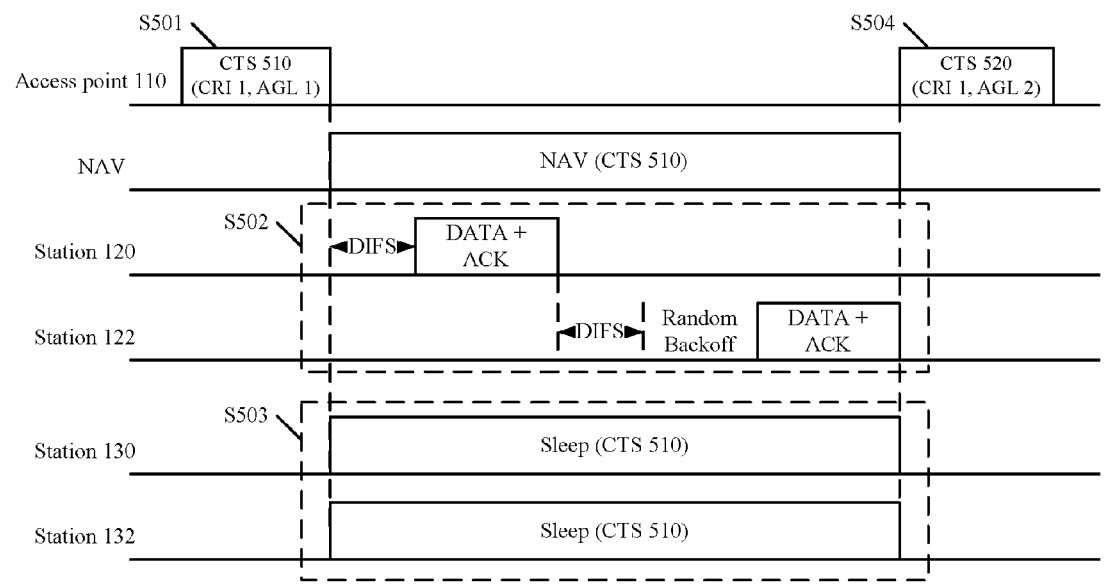
FIG. 5 illustrates an illustrative process of protecting stations in terms of group according to an embodiment of the invention.

FIG. 5 illustrates an illustrative process of protecting stations in terms of group according to an embodiment of the invention. In this embodiment, the stations 120 and 122 have joined in the access group identified by <CRI 1, AGL 1>, and the stations 130 and 132 have joined in the access group identified by <CRI 1, AGL 2>.

In the step S501, the access point 110 transmits a CTS frame 510 in a multicast manner to allocate a Network Allocation Vector (NAV) time for the stations in the access group identified by <CRI 1, AGL 1>. Upon reception of the CTS frame, the stations 120 and 122 are aware that the following duration indicated in the Duration field in the CTS frame 510 are reserved for them, because both of them belong to the access group identified by <CRI 1, AGL 1>.

In the step S502, the stations 120 and the 122 share the radio resource as in normal 802.11 DCF mode within the duration indicated in the CTS frame, i.e., within the duration NAV (CTS 510). For example, firstly the station 120 and then the station 122 send their data to be transmitted.

In the step S503, the station 130 and 132 will sleep within the duration NAV (CTS 510) after receiving the CTS frame 510, because they belong to the access group identified by <CRI 1, AGL 2>.

In the step S504, the access point 110 sends a CTS frame 520 in a broadcast manner to allocate an NAV time for the stations in the access group identified by <CRI 1, AGL 2>. Upon reception of the CTS frame, the stations 130 and 132 are aware that the following duration indicated in the Duration field in the CTS frame 520 are reserved for them, because both of them belong to the access group identified by <CRI 1, AGL 2>. In the meantime, the other stations, e.g., the stations 120 and 122, will sleep.

Those skilled in the art can appreciate that the access point 110 can adjust the radio resource allocated to the access group to be protected according to a change in network condition and/or a change in quality-of-service requirement of the access group to be protected. Specifically, for example, the access point 110 can allocate a radio resource with a longer duration for some access group to be protected.

In a further embodiment of the invention, the access point 110 can change at least one of the at least categorization rule and the access group corresponding thereto according to a network condition and/or a quality-of-service requirement of the access group to be protected.

Specifically, the access point 110 can change at least one of the at least categorization rule and the access group corresponding thereto on its own initiative or in response to a request of a non-access-point station in an access group, according to a change in network condition and/or in a quality-of-service requirement of the access group to be protected.

In a still further embodiment of the invention, the access point 110 can evaluate performance of one of all the access groups and adjust the status code of the access group according to a predetermined rule.

Any one or any combination of the following factors may become the judgments for adjusting access groups: a detected or anticipated severe collision between stations in the same access group, a detected or anticipated change in network load, a detected or anticipated change in type of traffic and any other operating conditions. The foregoing factors will be simply referred to as an "access group adjustment factor". Specifically there are the following two possible approaches:

Approach 1: Without Adjustment Solicitation from Stations.

In this approach, the access point 110 monitors and checks the access group adjustment factors for all the access groups, under either a trigger mode or a periodic mode. By evaluating these access group adjustment factors, the access point adaptively changes or does not change the last access group status codes in the access group information elements. Then the access point 110 transmits the updated information to the stations in a downlink frame, e.g., a Beacon frame, an Association Response frame, a Probe Response frame, an access group Action frame to be detailed below, etc. in an increment or real value form. Upon reception of the downlink frame, the stations check the access group status codes corresponding to the access groups to which they belong and decide to join/stay in/leave the access groups.

Approach 2: With Adjustment Solicitation from Stations.

In this approach, the stations can initiate an access group adjustment request in an access group Action frame to be detailed below (referred here to as an access group Adjustment Request frame). Thus the access point 110 can reply to the stations regarding how to adjust the access groups in another access group Action frame to be detailed below (referred here to as an access group Adjustment Response frame). The access group Adjustment Response frame can be used in an unsolicited manner and hence may be applicable to the first approach.

Figure 6:
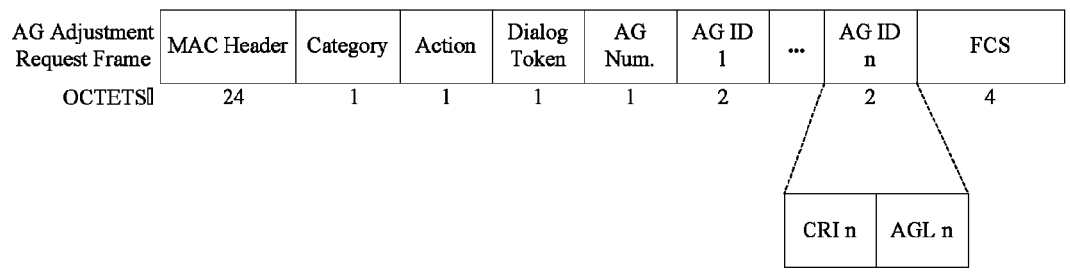
FIG. 6(a) and FIG. 6(b) respectively illustrate an encoding format of an adjustment action frame of an access group according to an embodiment of the invention.
Figure 6:
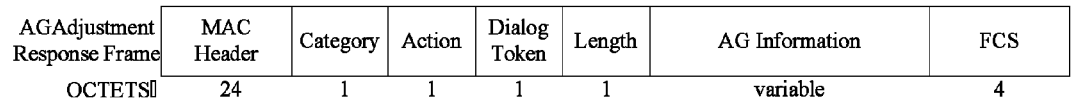

FIG. 6 illustrates encoding formats for access group Adjustment Action frames respectively, wherein FIG. 6(a) illustrates an access group Adjustment Request frame, and FIG. 6(b) illustrates an access group Adjustment Response frame.

In FIG. 6(a), the access group Adjustment Request frame includes:

1) Category: 1-octet field indicating that this action frame relates to access group adjustment.

2) Action: 1-octet field indicating that the action frame is for adjustment request.

3) Dialog Token: 1-octet field utilized by both station and access point to track access group adjustment.

4) Number of Access Groups: 1-octet field indicating the number of access group IDs.

5) Access Group ID n: 2-octets field, indicating the access group ID of the n-th access group, composed of a 1-octet CRI and a 1-octet AGL.

In FIG. 6(b), the access group Adjustment Response frame includes:

1) Category: 1-octet field indicating that this action frame relates to access group adjustment like in the access group Adjustment Request frame.

2) Action: 1-octet field indicating that the action frame is for adjustment response.

3) Dialog Token: 1-octet field utilized by both station and access point to track access group adjustment.

4) Length: 1-octet field indicating the number of octets in the access group information field.

Figure 2:
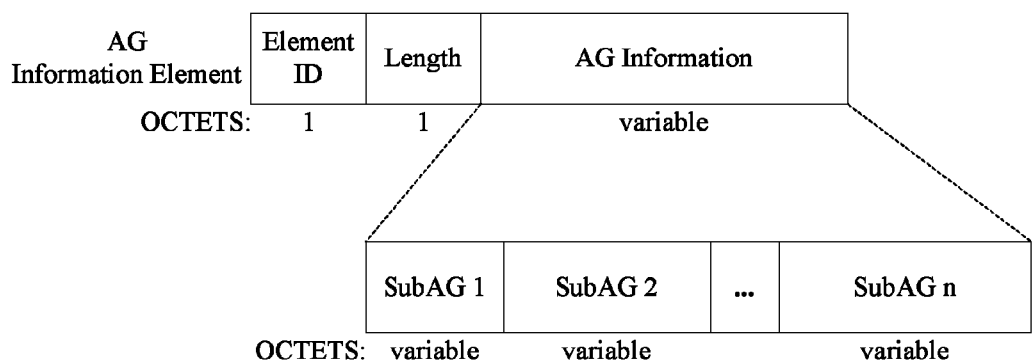
FIG. 2(a) and FIG. 2(b) illustrate an encoding format of an access group information element according to an embodiment of the invention.

5) access group information: variable length field containing a variable number of SubAG subfields with the same format as those defined in the access group information element as illustrated in FIG. 2.

Figure 7:
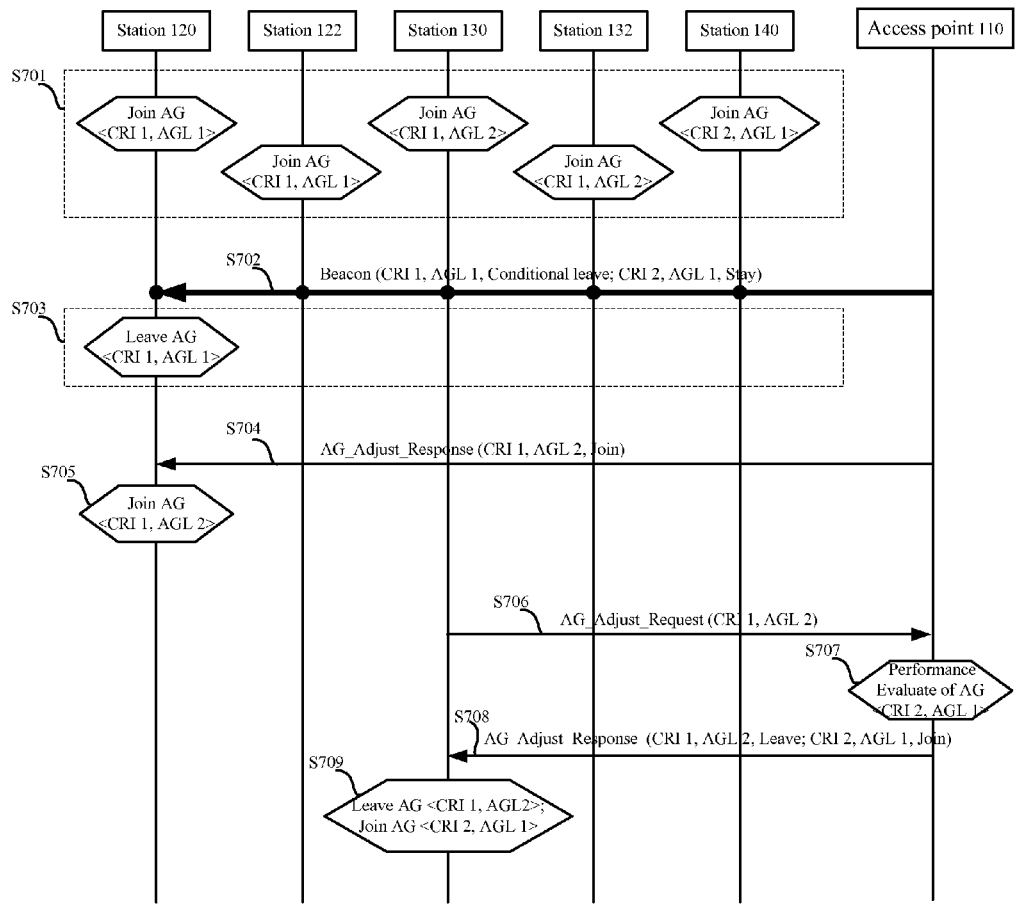
FIG. 7 illustrates a flow chart of adjusting an access group according to an embodiment of the invention.

FIG. 7 illustrates a flow chart of adjusting an access group using the first or the second approach. In the step S701, the stations 120 and 122 join in the access group identified by <CRI 1, AGL 1>, the stations 130 and 132 join in the access group identified by <CRI 1, AGL 2>, and the station 140 joins in the access group identified by <CRI 2, AGL 1>.

In the step S702, the access point 110 sends a Beacon frame carrying an access group information element. As illustrated, the Status Code of the access group identified by <CRI 1, AGL 1> is "Conditional Leave", and the Status Code of the access group identified by <CRI 2, AGL 1> is "Stay". Upon reception of the Beacon frame, the station 120 conditionally leaves, whereas the station 122 conditionally stays in the access group identified by <CRI 1, AGL 1>. The station 140 stays in the access group identified by <CRI 2, AGL 1> as instructed by the Beacon frame. Moreover the stations 130 and 132 stay in the access group identified by <CRI 1, AGL 2> without any explicit instruction of the access group information element.

In the step S704, the access point 110 sends an Action frame (i.e., an access group Adjust Response frame) to the station 120 on its own initiative according to the first approach. An access group information element in the frame instructs the station 120 to join the access group identified by <CRI 1, AGL 2>, with the access group Status Code of "Join". Thereafter in the step S705, the station 120 joins the access group according to such information.

In the step S706, the station 130 sends an Action frame (i.e., an access group Adjustment Request frame) to the access point 110 to request for instruction for leaving or staying in the access group identified by <CRI 1, AGL 2>. Thus in the step S707, the access point 110 evaluates the performance of the access group and finds that it is overloaded according to the second approach. Hence the access point 110 decides to direct the station 130 to another lightly loaded access group identified by <CRI 2, AGL 1>. In the step S708, the access point 110 sends an Action frame (i.e., an access group Adjustment Response frame) to the station 130. An access group information element in the frame instructs the station 130 to leave the access group identified by <CRI 1, AGL 2> and to join in the access group identified by <CRI 2, AGL 1>. Upon reception of the access group Adjustment Response frame, the station 130 leaves the access group identified by <CRI 1, AGL 2> and joins in the access group identified by <CRI 2, AGL 1> in the step S709.

According to the solutions of the invention, non-access-point stations are divided into access groups, and a non-access-point station may concurrently belong to a plurality of access groups. A non-access-point station can Join/Not Join/Stay in/Leave an access group dynamically. Each group can be equivalently regarded as an access category, so more access categories can be provided for refined traffic control. Moreover the invention can distinctly resolve the contention for radio resource between the stations and effectively limit the number of concurrently contending stations.

The invention can further provide flexibility in access control of an access group. An access point may schedule the access groups not only in a fixed order but also by sending a CTS frame in an unsolicited manner to prioritize the access groups as needed in practice. Advantageously a period reserved for an access group can also be varied flexibly.

Those skilled in the art shall appreciate that the invention apparently will not be limited to the details of the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. A method of scheduling a radio resource in an access point of a wireless local area network, at least one categorization rule being set in the wireless local area network, and at least one access group being set for a plurality of non-access-point stations served by the access point according to each of the at least one categorization rule, the method comprising:
   sending at least one categorization message to at least one of a plurality of stations, each categorization message including information about an access group from a plurality of access groups which are set in the wireless local area network according to the at least one categorization rule, and the information about the access group including first information, second information and third information, the first information indicating the categorization rule of the access group, the second information indicating an access group label of the access group, and the third information indicating a status code of the access group;
   sending a clear-to-send frame to the plurality of stations to indicate the radio resource allocated to the access group be protected among the plurality of access groups and
   changing at least one of the at least one categorization rule and the corresponding access group according to a network condition or a quality-of-service requirement of the access group to be protected.

2. The method according to claim 1, further comprising:
   evaluating performance of one of the plurality of access groups; and
   adjusting the status code of the access group according to a rule.

3. The method according to claim 2, further comprising:
receiving, before evaluating the performance of one of the plurality of access groups, a first request message from a station belonging to the access group, the first request message requesting the access point to adjust the access group.

4. The method according to claim 1, wherein the status code of the access group includes one of Join, Conditional Join, Stay, Conditional Leave and Leave.

5. The method according to claim 1, further comprising:
adjusting the radio resource allocated to the access group to be protected according to at least one of a change in network condition and a change in quality-of-service requirement of the access group to be protected.

6. The method according to claim 1, further comprising:
sending the at least one categorization message to the at least one of the plurality of stations in response to receiving a request for the categorization message from the at least one of the plurality of stations.

7. The method according to claim 1, wherein a receiver address included in the clear-to-send frame indicates a group address of the access group to be protected.

8. A method of scheduling a radio resource in a non-access point station of a wireless local area network, the wireless local area network including a plurality of non-access-point stations and an access point serving the plurality of non-access-point stations, at least one categorization rule being set in the wireless local area network, and at least one access group being set for the plurality of non-access-point stations according to each of the at least one categorization rule, the method comprising:
receiving, at at least one of the plurality of stations, at least one categorization message from the access point, each categorization message including information about an access group from a plurality of access groups which are set in the wireless local area network according to the at least one categorization rule, and the information about the access group including first information, second information and third information, the first information indicating the categorization rule of the access group, the second information indicating an access group label of the access group, and the third information indicating a status code of the access group;
at least one of joining, not joining, staying in, and leaving the access group, by the at least one of the plurality of stations, according to the third information of the access group;
receiving, by the at least one of the plurality of stations, a clear-to-send frame from the access point; and
if an access group to be protected, as indicated in the clear-to-send frame, is the access group which the at least one of the plurality of stations currently has joined, contending for a radio resource in a period indicated in the clear-to-send frame, at least one of the at least one categorization rule and the corresponding access group being changed according to a network condition or a quality-of-service requirement of the access group to be protected.

9. The method according to claim 8, further comprising:
if the access group, to be protected, is different from the access group which the station currently has joined, maintaining a sleep mode in the period indicated in the clear-to-send frame.

10. The method according to claim 8, further comprising:
adjusting the status code of any one of all the access groups according to a rule.

11. The method according to claim 10, further comprising:
sending a first request message to the access point to request the access point to adjust the access group.

12. The method according to claim 8, wherein the status code of the access group comprises Join, Conditional Join, Stay, Conditional Leave and Leave.

13. The method according to claim 8, further comprising:
sending, prior to receiving the at least one categorization message from the access point, a second request message to the access point to request the categorization message.

* * * * *